No. 784,921. Patented March 14, 1905.

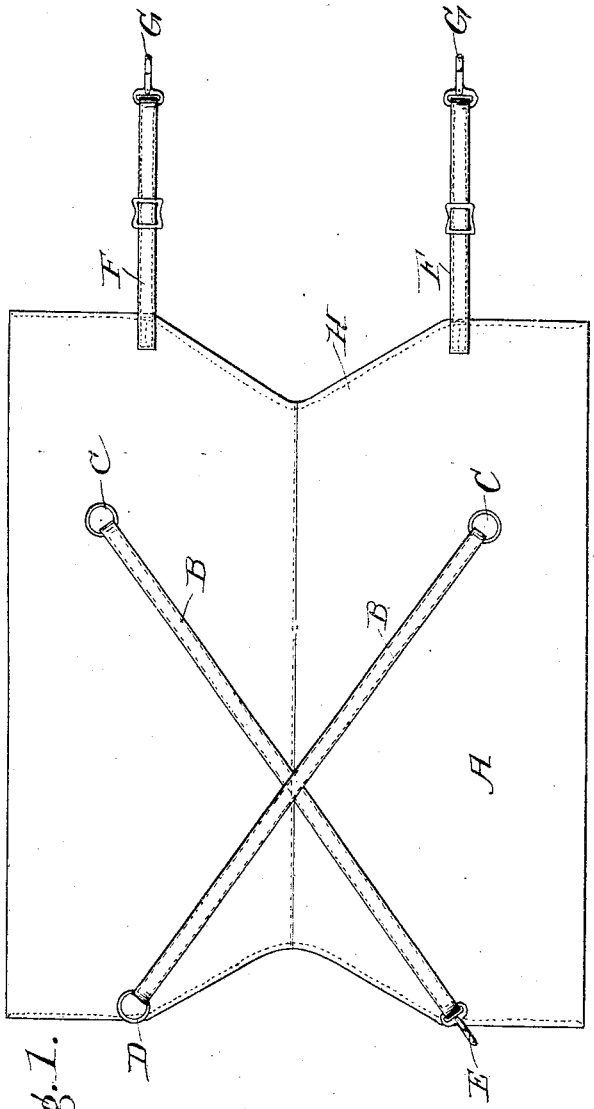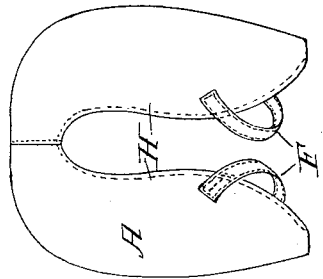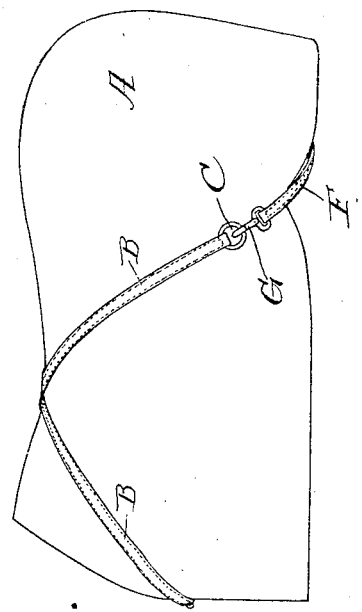

UNITED STATES PATENT OFFICE.

TOBIAS CLEMETSON AND GABRIEL CLEMETSON, OF DULUTH, MINNESOTA.

HORSE OR CATTLE BLANKET.

SPECIFICATION forming part of Letters Patent No. 784,921, dated March 14, 1905.

Application filed November 14, 1903. Serial No. 181,260.

*To all whom it may concern:*

Be it known that we, TOBIAS CLEMETSON and GABRIEL CLEMETSON, citizens of the United States, residing at the city of Duluth, in the county of St. Louis and State of Minnesota, have invented a new and useful Horse or Cattle Blanket, of which the following is a specification.

Our invention relates to improvements in horse and cattle blankets; and the objects of our improvements are to provide a blanket which will keep a horse or cow clean; will remain on a horse or cow no matter what the action of animal, whether standing, lying down, or rolling over; which will have no particular strain at any point, but will adjust itself according to the motions or actions of the animal, and which will require no surcingle around the animal's body to keep it in place. We attain these objects by the mechanism illustrated in the accompanying drawings, in which—

Figure 1 is a top view of the entire blanket. Fig. 2 is a side view showing how it would appear if in position on the animal, and Fig. 3 is a rear view showing how it would appear if in position on animal.

The blanket-body A can be made of any material commonly used for blankets and is cut as shown in Fig. 1.

Straps B B are sewed upon the outer side of the blanket and extend diagonally from the front edge of the blanket toward the rear edge of the same, intersecting on the medial line of the blanket, as clearly shown in Fig. 1. The rear ends of these straps carry rings C and are arranged at such points of the blanket that when the blanket is in position these rings will be near but in advance of the hindquarters and near the bottom edge of the blanket. The front end of one of the straps carries a ring D, while the front end of the other strap carries a hook E, adapted to engage said ring, and thereby fasten the blanket across the breast of the animal. To the rear edge of the blanket we secure straps F, carrying hooks G at their ends. These straps are adapted to pass around the rear legs of the animal and have the hooks G engaged in the rings C, thereby holding the bottom edges of the blanket in close to the body of the animal, as clearly shown in Figs. 2 and 3.

The rear edge of the blanket is cut away from its medial line toward the side edges, as shown at H, to represent a notch, which will permit the blanket to clear the animal's tail, while at the same time the rear corners of the blanket may be wrapped around the legs of the animal, so as to keep them clean under all conditions.

The straps F are of sufficient length to allow them to be brought around rear legs of animal and passed under and brought out at the side. The end of strap that is brought out in this manner has a snap attached to it, which is snapped into the ring on end of strap fastened to side of blanket. The strap when so fastened is shown in Fig. 2. One of these straps is on each side, and both are fastened in the same manner. The straps will be from three to three and one-half feet in length and will have a reversible buckle on them, so they can be lengthened or shortened, according to the size of the animal.

The rear end of blanket is cut in such a manner as to allow it to be brought around the rear legs of the animal, thus keeping them clean. This is done by taking the material of which the blanket is to be made and cutting a piece seventy inches in width by eighty inches in length, and folding same gives an oblong double piece thirty-five inches in width by eighty inches in length. The place where material is doubled is considered the top and the short measurements the ends.

Measuring from rear end of blanket along the top twelve inches a point is made. Then measuring down on rear end one-half the depth of blanket another point is made. A diagonal line is then made connecting these two points and the material is cut along this line, thus giving the desired laps at the bottom rear end of blanket. This is plainly seen in Fig. 1. The laps made by this cut are brought around the rear legs of animal and when the animal urinates or stools the legs are kept clean.

The blanket, as shown in Fig. 1, is placed on back of animal and fastened in front by ring and snap shown on front end of same. The straps shown on rear end of Fig. 1 are then passed around the rear legs of animal, the one on the right side being passed around the right leg and the one on the left side being passed around the left leg. The strap is brought out on side and fastened, as shown in Fig. 2, this being done on both sides. The blanket is then in position and cannot be twisted or turned on body of the animal, because it is held in place by the straps. The blanket is thus held firmly in position without particular strain at any point.

What we claim as our invention, and desire to secure by Letters Patent, is—

1. An animal-blanket having intersecting diagonal straps secured upon its outer side, said straps extending from the front edge or end of the blanket to points near the rear and side edges of the blanket and being provided with fastening means at their front ends, and connections between the rear ends of the straps and the rear of the blanket.

2. An animal-blanket having intersecting diagonal straps secured on its outer side, said straps extending from the front edge of the blanket to points near the rear and side edges of the blanket and provided with connecting means at their front ends, rings carried by the rear ends of the said straps, and straps secured to the rear end of the blanket and carrying hooks adapted to engage the rings at the rear ends of the intersecting straps.

TOBIAS CLEMETSON.
GABRIEL CLEMETSON.

Witnesses:
LUCIEN A. BARNES,
JAMES P. WEIR.